Sept. 8, 1970  A. I. PARVIN ET AL  3,527,855
FILM-FORMING METHOD AND APPARATUS
Filed April 28, 1967  3 Sheets-Sheet 1

INVENTORS
ALLAN I. PARVIN,
IHOR WYSLOTSKYI &
BY  DOUGLAS P. ROOME
Brumbaugh, Free, Graves &
Donohue
their  ATTORNEYS INVENTORS
ALLAN I. PARVIN,
IHOR WYSLOTSKYI &
DOUGLAS P. ROOME
BY Brumbaugh, Free, Graves & Donohue
their ATTORNEYS Sept. 8, 1970   A. I. PARVIN ET AL   3,527,855

FILM-FORMING METHOD AND APPARATUS

Filed April 28, 1967   3 Sheets-Sheet 3

INVENTORS
ALLAN I. PARVIN,
IHOR WYSLOTSKYI &
BY   DOUGLAS P. ROOME their   ATTORNEYS United States Patent Office 3,527,855
Patented Sept. 8, 1970

3,527,855
FILM-FORMING METHOD AND APPARATUS
Allan I. Parvin, Millburn, N.J., Ihor Wyslotskyi, Evanston, Ill., and Douglas P. Roome, Cedar Grove, N.J., assignors to Standard Packaging Corporation, New York, N.Y., a corporation of Virginia
Filed Apr. 28, 1967, Ser. No. 634,764
Int. Cl. B29c 17/04; B29h 7/02
U.S. Cl. 264—92        7 Claims

ABSTRACT OF THE DISCLOSURE

The specification describes several embodiments of a film-forming apparatus of a packaging machine. In each embodiment of the film-forming apparatus, there is provided a cavity in communication with a source of suction for stretching a formable film into the cavity, and means defining a retractable stretch controlling surface accommodated within the cavity and interposed in the path of a portion of the film stretched therein to retard the stretching thereof. In addition, in some of the embodiments there is a recess within the cavity for receiving the stretch controlling surface in retracted position, the base of the cavity and the retracted stretch controlling surface cooperating to define the base of the cavity in which the film is formed.

---

This invention relates to improvements in packaging machines of the type in which at least one film is vacuum formed in a mold or cavity, and more particularly, to a novel means and method for controlling the stretching of the film by vacuum in the mold of the packaging machine.

In certain conventional packaging machines a formable plastic film is fed over a mold cavity and heated, the film is stretched into the mold cavity by vacuum to shape the film in the form of a pocket or tray, a food product, for example, meat or cheese, is introduced into the formed tray of the film, another plastic film is fed over the product, and the two films are heat-sealed together around the periphery of the mold cavity to produce a three-dimensional package. In vacuum packaging machines of this type the air is evacuated from the package before the final sealing thereof.

During the vacuum forming operation, the formable film has a tendency to stretch more in certain areas than in others, thereby producing a package which is thinner and weaker in the overstretched areas. For example, if the base of the cavity is square or rectangular in shape, the formable film has a tendency to overstretch in the corners. The resulting package is more susceptible to damage in these weakened, overstretched areas and may tend to leak.

The present invention provides a film-forming apparatus and method which overcomes these problems by providing a mold cavity having means therein to reduce or retard the stretching of certain areas of the film, thereby producing a package in which the film is drawn or stretched more uniformly in the cavities without weakened corners or other overstretched areas which may tend to produce leakage. The stretch reducing or retarding means preferably includes upstanding retractable stretch controlling surface means disposed within the cavity to engage areas of the film which may tend to overstretch, such as the areas which would normally stretch into the corners of the cavity. These stretch controlling surface means prevent further stretching of the film on contact therewith so that as the film is drawn further into the cavity and the stretch controlling surface means are retracted into the base of the cavity, further stretching of the film will be in the areas not in contact with the stretch controlling surface means. The present invention thus makes it possible to limit the stretching of certain areas of the film to prevent overstretching of those areas.

For a more complete understanding of the present invention, reference can be made to the detailed description which follows and to the accompanying drawings, in which.

Figure 1:
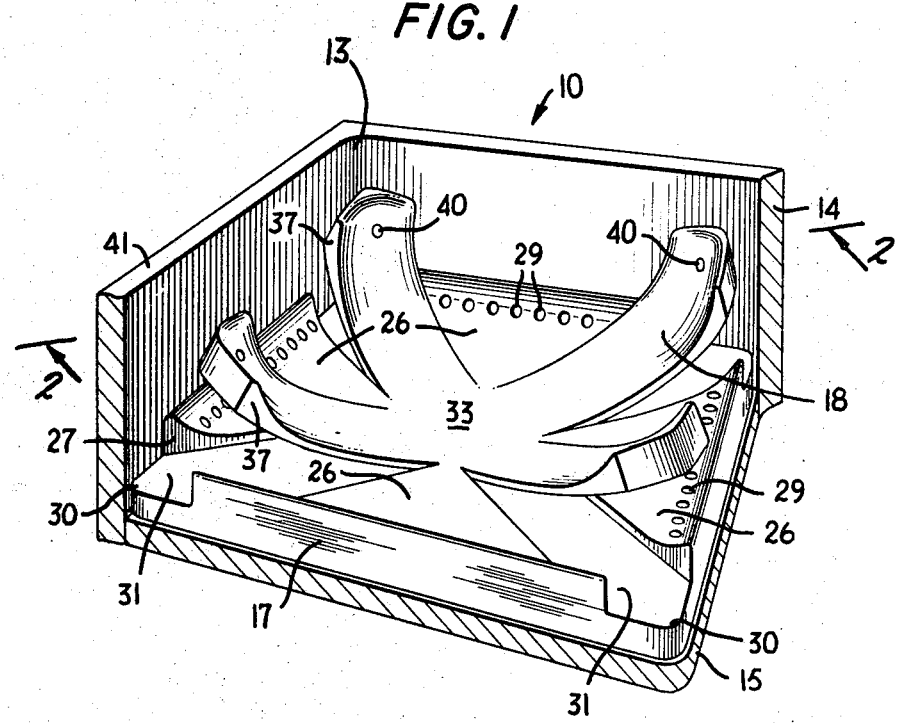
FIG. 1 is a perspective view, partly in section, of a cavity of the film-forming apparatus of a packaging machine embodying the present invention.
Figure 2:
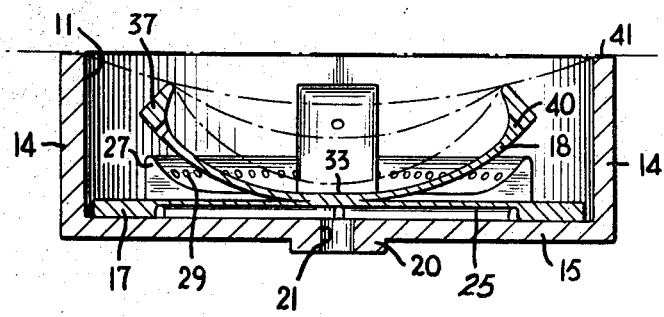
FIG. 2 is a sectional view taken along the line 2—2 of FIG. 1.

Referring to FIGS. 1 and 2, the film-forming apparatus includes a mold or cup 10 forming a die cavity 11 with four corners 13, the cavity 11 being defined by four side walls 14 having a rectangular configuration, and a bottom wall 15 integrally formed with the side walls 14. The mold 10 also accommodates a film-forming insert block 17 disposed within the cavity 11 and secured to the bottom wall 15 by any convenient means, such as machine screws, and four upstanding retractable finger members 18 having stretch controlling upper surfaces which reduce or retard the stretching of the portions of the film which stretch into the corners 13.

The bottom wall 15 is formed with a seal 20 having a passage 21 in communication with a source of suction. When a formable film is placed over the mold and heated, suction is applied to the mold cavity through the passage 21 to draw the film into the cavity to form the film to the shape of the cavity. The product is then placed in the formed film, a cover film is fed over the formed film containing the product and the two films are heat sealed together around the outer periphery of the mold to produce a sealed package.

When the retractable finger elements 18 are in their lowermost retracted positions the upper surfaces of the insert block 17 and the finger elements cooperate to define a composite dished forming surface at the bottom of the die cavity and thus determine the shape of the portion of the film formed in contact therewith. The fingers 18 are located at the corners 30 of the insert block 17 and are received within recesses 31 of complementary shape to the fingers and formed between the triangular shaped segments 26 of the insert block. Both the outer ends of the segments 26 and the fingers 18 curve upwardly to define raised formations 27 and 37, respectively. Thus, the upper surfaces of the fingers 18 and the segments 26 cooperate to define a tray-like film-forming surface when the fingers are retracted into their respective receiving recesses.

The segments 26 intermediate the raised fingers 18 have a series of passages formed in their outer raised formations 27 which communicate through passages 25 formed in the bottom of the tray-like insert block with the passage 21.

The four fingers members 18 are shown integrally formed with the central portion 33 of the block 17. The fingers are made of resilient material which biases them upwardly while permitting them to be forced downwardly into retracted positions within their respective recesses. In lieu of the integral construction shown, each finger 18 could be individually attached, anchored or hinged to the insert block, and if hinged, the fingers could be spring urged upwardly. When in fully retracted positions, the upper surfaces of the fingers form continuations of the adjacent surfaces of the segments 26. At least one hole 40 extends through each finger 18 near the outer end to aid in drawing the formable film into engagement with the upper surface of the finger 18 and to eliminate entrapped air between the film and the finger which might prevent the film from coming into contact with the upper surface of the finger.

In operation, when suction is applied to the mold cavity 11, the portions of the heated formable film drawn into the mold cavity 11 toward the corners thereof engage the upper surfaces of the fingers 18, cooling and setting or partially setting those portions of the film. The portions of the film drawn into the cavity and not engaging the fingers, i.e., the film portions intermediate the fingers 18 and between the fingers and the walls of the die cavity, continue to be drawn, thus stretching to a greater degree. The yieldable fingers 18 retard the downward movement and stretching of the film in the corner areas as they yield towards the corners 13 from their upstanding positions. When finally seated in their recessed channels 31, the fingers 18 and the block 17 define a continuous co-planar top surface which forms the bottom of the film in the form of a pocket or tray. The film will of course be thicker and stronger in positions where it has engaged fingers 18 and where it has engaged the segments 26.

At this point in operation after the film is formed, the product is placed in the pocket formed in the film, a cover film is laid over the mold 10, the two films are heat-sealed around the top surface 41 of the walls 14, producing a three-dimensional package, air is withdrawn through an air evacuation passage, and the air evacuation passage is sealed.

A particular commodity to be packaged may, for example, be circular or wedge shaped in configuration. Practically any shape of package can be formed by providing the appropriate complementary shaped mold surface within the die cavity.

Figure 3:
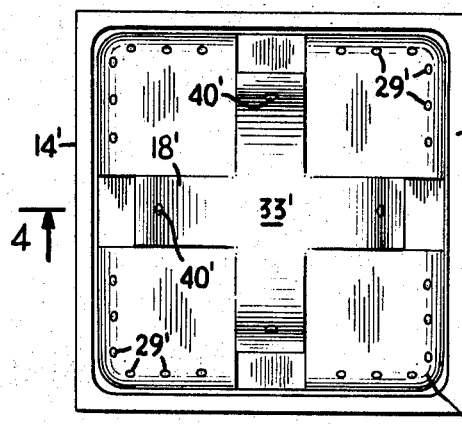
FIG. 3 is a plan view of a cavity embodying another form of the invention.
Figure 4:
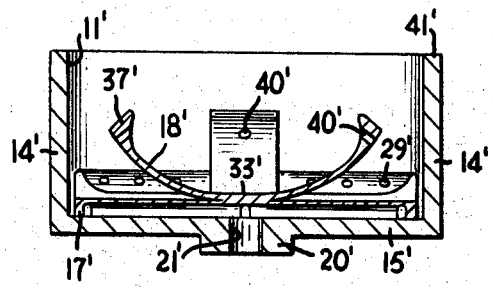
FIG. 4 is a sectional view taken along the line 4—4 of FIG. 3.

FIGS. 3 and 4 show another embodiment in which similar parts are designated by the same reference numerals as in FIGS. 1 and 2. The two embodiments are essentially the same, except the resilient fingers 18' are disposed in positions intermediate adjacent corners of the mold 10'. With this arrangement, the stretching of the formed film will be retarded between the corners of the insert block 17', and the formed package will have heavier walls in these areas. Thus, it is apparent that by changing the location of the resilient fingers 18' within the mold cavity, the strength or wall thickness of parts of a particular package can be controlled.

Figure 5:
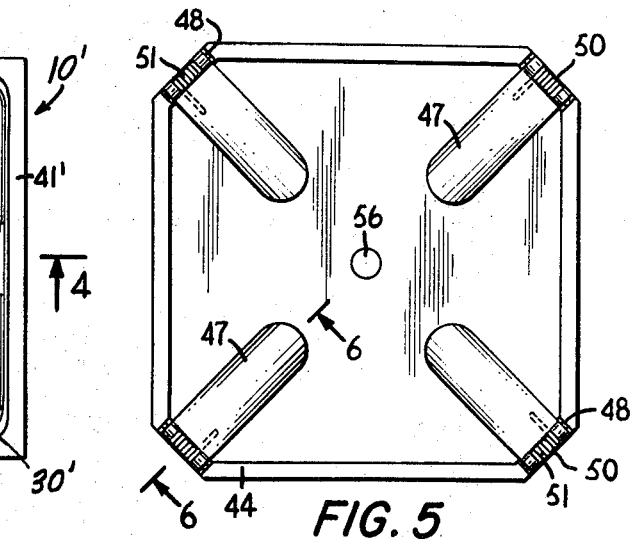
FIG. 5 is a plan view illustrating still another embodiment of the invention.
Figure 6:
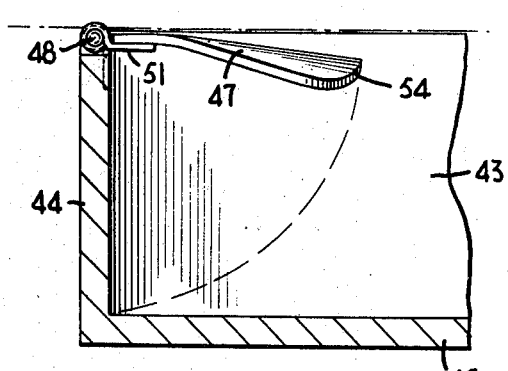
FIG. 6 is a sectional view, partially broken away, taken along the line 6—6 of FIG. 5.

In the arrangement shown in FIGS. 5 and 6, a cavity 43 is defined by side walls 44 and a bottom wall 45. Four finger members 47 are mounted upon respective pins 48 each fixed at a top corner 50 of a side wall 44. A torsion spring 51 coiled about each pin 48 urges its finger 47 upwardly to a position wherein it extends from the pin 48 inwardly and arcuately downwardly, terminating in a free end 54 disposed within the confines of the mold cavity 43 and spaced from the walls 44 and 45. A port 56, centrally located in the bottom wall 45, provides communication for a source of suction to the mold cavity 43.

In operation, when suction is applied through the port 56, the formable plastic sheet engages the top surface of each finger 47, preventing or retarding further stretching of that portion of the film as the fingers continue to move downwardly to their retracted positions. The portion of the film between each of the corners 50, being unobstructed by the fingers 47, is drawn more quickly into the cavity 43 and into a seating or engaging relation with the bottom wall 45. When the sheet has been fully drawn into the mold cavity 43, each finger 47 will be pivoted downward to a position wherein it engages the interior surface of its corresponding side wall 44.

Figure 7:
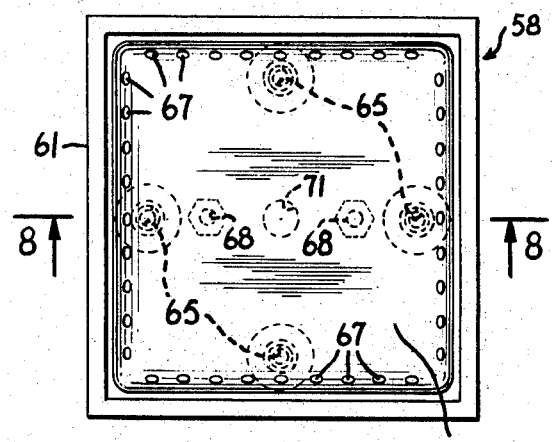
FIG. 7 is a plan view illustrating still another embodiment of the invention.
Figure 8:
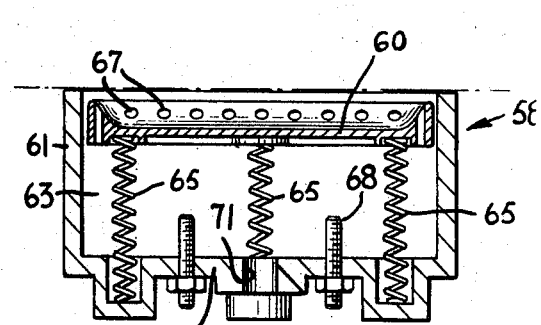
FIG. 8 is a sectional view taken along the line 8—8 of FIG. 7.

In the embodiment illustrated in FIGS. 7 and 8, a mold 58 accommodates stretch-controlling means in the form of a vertically movable spring urged tray 60 disposed in the mold cavity 63 defined by side walls 61 and a bottom wall 62. Normally the tray 60, spaced from the walls 61 and 62, is urged to the position shown in FIG. 8 by a plurality of springs 65 interposed between the tray and the bottom 62 of the mold. Holes 67 are formed through the tray at the outer periphery thereof for the removal of entrapped air between the formed film and the tray when air is evacuated from the mold cavity through the suction passage 71. Adjustable stops 68 upstanding from the bottom of the mold limit the depth of draw.

In the operation of the embodiment shown in FIGS. 7 and 8, a heated formable film clamped to the top of the mold is drawn into the mold cavity as the air from the cavity is withdrawn through the suction passage 71. When the formable film comes into contact with the upper surface of the tray 60 it cools and sets, and the further stretch of the formable film is confined to the outer regions of the formable film, that is, the outer portions intermediate the tray 60 and the upper edge of the mold.

The tray 60 is shown in FIGS. 7 and 8 as square-shaped, but it can be circular, rectangular or any other desired shape.

Figure 9:
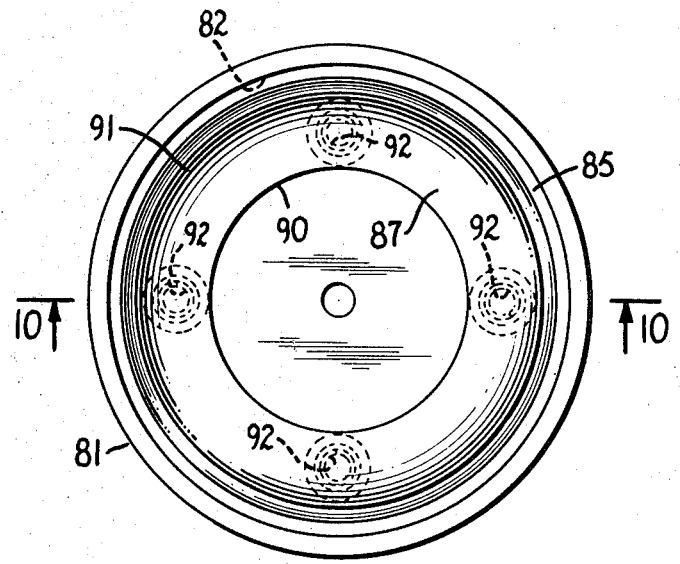
FIG. 9 is a plan view illustrating still another embodiment of the invention.
Figure 10:
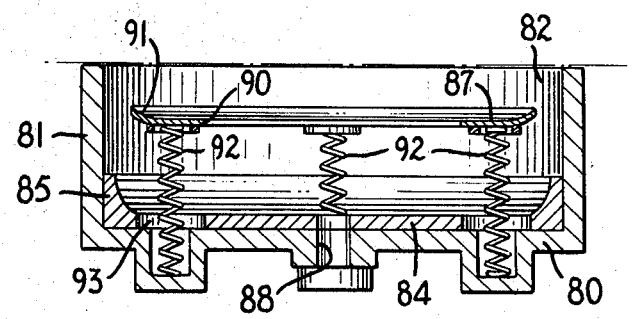
FIG. 10 is a sectional view taken along line 10—10 of FIG. 9.

The mold of FIGS. 9 and 10 comprises a bottom wall 80 and side walls 81 defining a mold cavity 82, a block 84 secured to the bottom wall 80 having a peripheral raised flange 85 at its outer edge which flares upwardly, and a raised platform 87. Vacuum is provided to the mold cavity 82 through a passage 88 in the bottom wall 80. The raised platform 87, disposed in the cavity 82 and spaced from the bottom wall 80 and side walls 81, is formed with a central opening 90, so that it is essentially of annular or ring-shaped configuration with a raised outer flange 91 flaring upwardly and outwardly. The platform 87 is maintained in this position by compression springs 92 fixed to the undersurface of the ring 87 and the bottom wall 80. The springs 92 are disposed in an annular channel 93 formed in the block 84 and positioned directly under and adapted to receive the platform 87 when suction is applied to the mold cavity 82.

In operation when the formable film is deflected downwardly due to suction applied, it first engages the upstanding flange 91 of the platform 87. At the same time, the platform 87 will be deflected downwardly against the action of the compression springs 92. The portion of the plastic film which engage the top surface of the platform member 87 tend to cool and set, whereas the outer and central portions of the film, not in contact with any cooling surface, continue to be stretched. When the platform 87 is fully seated, it is disposed within the annular channel 93 where the top surfaces of the block 84 and the platform 87 will be substantially co-planar. The film and the package made therefrom have a thicker wall where the film engaged the top surface of the platform 87 than at the outer and central portions of the film.

The movable platform is shown as of circular configuration, but just as in the embodiment shown in FIG. 7 and 8 it may be of rectangular, square or other configuration.

The invention has been shown in preferred forms and by way of example only, and obviously, many variations and modifications may be made therein without departing from the spirit of the invention.

We claim:

1. A film-forming method comprising the step of drawing a heated formable film into a mold cavity by the application of suction to the cavity, said mold cavity having at least one corner, bringing the portion of the film to be stretched toward said corner into engagement with the free end of a yieldable element which is connected at its other end to the mold, biasing said yieldable element to hold the free end thereof in raised condition and continuing the application of suction to the mold cavity to permit other areas to continue to stretch and to force the free end of the yieldable element to a retracted position in which it forms part of the mold.

2. A film-forming apparatus comprising a mold containing a cavity in communication with a source of suction for stretching a heated formable film into the shape of the cavity, and a yieldable element connected at one end to the mold and having a free end biased to a raised position out of contact with the mold cavity to engage an area of the film as it is stretched into the cavity, the yielding element serving to retard the stretching of that area of the film which it engages while permitting other areas of the film to continue to be stretched into the mold cavity, said free upstanding end of the yielding element gradually retreating within the mold cavity under the force exerted thereon by the film to form part of the mold as the film is drawn into the mold cavity.

3. A film-forming apparatus as set forth in claim 2 in which the yieldable element is integrally connected to part of the mold.

4. A film-forming apparatus as set forth in claim 2 including means pivotally connecting the yieldable element to the mold cavity and resilient means for biasing the yieldable element to its upstanding position.

5. A film-forming apparatus as set forth in claim 2 in which the cavity has at least one corner toward which the free end of the yielding element retreats.

6. A film-forming apparatus comprising a mold containing a cavity in communication with a source of suction for stretching a heated formable film into the cavity, a yieldable element biased to a raised position out of contact with the mold cavity to engage an area of the film as it is stretched into the cavity, means pivotally mounting the yieldable element upon a side wall of the mold cavity and resilient means for urging the yieldable element to a position wherein its free end is disposed in raised position in the mold cavity.

7. A film-forming apparatus comprising a mold having side walls and a bottom wall defining a cavity with a plurality of corners, the cavity being in communication with a source of suction for stretching a heated formable film into the cavity, a plurality of upstanding, yieldable stretch controlling fingers accommodated within the cavity, each of the stretch controlling fingers disposed adjacent a corner for engaging and cooling a portion of the film stretching into a corner and retarding the stretching of that portion of the film as the said finger yields towards a corner of the bottom wall while permitting portions of the film not engaging said stretch controlling means to stretch to a greater degree, and recessed means within the cavity and of complementary shape to the finger for receiving the finger in retracted position, the base of the cavity and the upper surface of the finger in retracted position cooperating to define a composite filmforming surface within the cavity.

References Cited

UNITED STATES PATENTS 3,010,152    11/1961    Braund.
3,178,771    4/1965    Fischer.

FOREIGN PATENTS 1,120,119    12/1961    Germany.

ROBERT F. WHITE, Primary Examiner

J. H. SILBAUGH, Assistant Examiner

U.S. Cl. X.R.

18—19